United States Patent [19]

Saiki et al.

[11] 4,102,127
[45] Jul. 25, 1978

[54] CATALYZER HEATING DEVICE FOR AN INTERNAL COMBUSTION ENGINE

[75] Inventors: Junichi Saiki, Susono; Syouzi Watanabe, Numazu; Takehisa Yaegashi; Tetsuro Nagano, both of Susono, all of Japan

[73] Assignee: Toyota Jidosha Kogyo Kabushiki Kaisha, Japan

[21] Appl. No.: 777,574

[22] Filed: Mar. 15, 1977

[30] Foreign Application Priority Data

Jan. 31, 1977 [JP] Japan ................... 52-8722

[51] Int. Cl.² .................. F02B 75/10; F01N 3/15
[52] U.S. Cl. ....................... 60/284; 60/286; 60/300
[58] Field of Search ................. 60/284, 286, 300

[56] References Cited

U.S. PATENT DOCUMENTS

| | | | |
|---|---|---|---|
| 2,953,898 | 9/1960 | Cornelius | 60/286 |
| 3,723,070 | 3/1973 | Houdry | 60/300 |
| 3,732,696 | 5/1973 | Masaki | 60/286 |
| 3,842,600 | 10/1974 | Nakajima | 60/286 |
| 3,886,739 | 6/1975 | Lee | 60/300 |

*Primary Examiner*—Douglas Hart
*Attorney, Agent, or Firm*—Stevens, Davis, Miller & Mosher

[57] ABSTRACT

Disclosed is a catalyzer heating device of an internal combustion engine. The glow plug is disposed in the catalyzer of the catalytic converter. The glow plug is operated when the temperature of the engine and the temperature of the catalyzer are relatively low so as to increase the temperature of the catalyzer for improving the exhaust gas purifying efficiency in the catalyzer.

8 Claims, 4 Drawing Figures

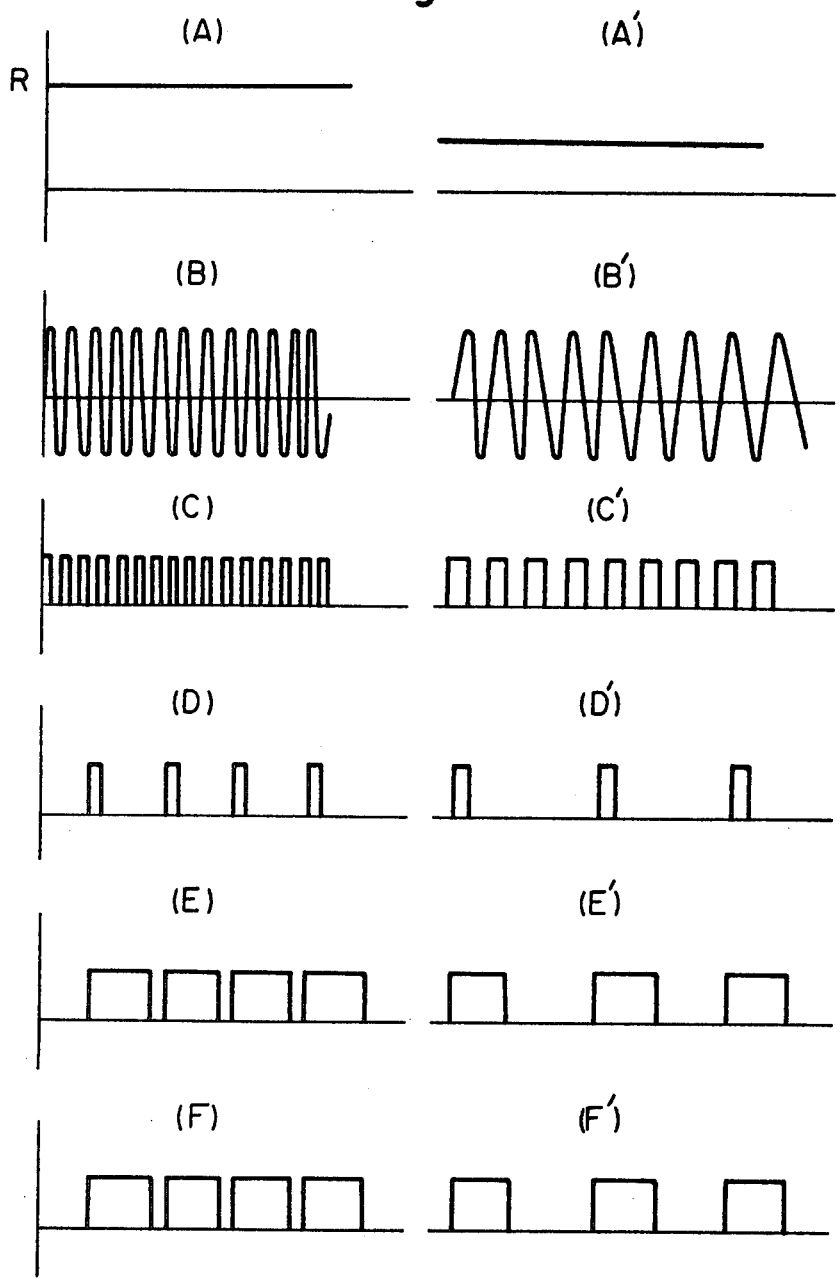

CATALYZER HEATING DEVICE FOR AN INTERNAL COMBUSTION ENGINE

DESCRIPTION OF THE INVENTION

The present invention relates to a catalyzer heating device, and particularly relates to a device for heating a catalyzer in the catalytic converter of an internal combustion engine.

As a method for reducing the amount of harmful components in the exhaust gas, there has been known a method of using a catalytic converter containing an oxidizing catalyzer, a reducing catalyzer or a three way catalyzer. The exhaust gas purifying efficiency in the catalyzer of this type is extremely reduced when the temperature of the catalyzer is relatively low. Consequently, in the case wherein the engine is started when the engine is completely cold, there occurs a problem in that exhaust gas containing a large amount of harmful components therein is discharged into the atmosphere until the time when the temperature of the catalyzer attains a predetermined level, for example, 200° through 300° C. In addition, a large amount of harmful components is produced in the cylinders of the engine at the time of idling when the engine is not completely warmed up. Consequently, at the time of idling when the temperature of the catalyzer is relatively low, since a large amount of harmful components is produced in the cylinders of the engine and the exhaust gas purifying efficiency in the catalyzer is relatively low, exhaust gas containing an extremely large amount of harmful components is discharged into the atmosphere.

In the case wherein a relatively cold engine is started but the temperature of the catalyzer is relatively high, that is, wherein the ignition switch is switched off a little while after the engine is started, and then the engine is started again, a large amount of harmful components is also produced in the cylinders of the engine. However, in this case, since the exhaust gas purifying effecincy is relatively high, the amount of harmful components in the exhaust gas is not very large. In addition, in the case wherein the temperature of the engine is relatively high and the temperature of the catalyzer is relatively low, that is, wherein the ignition switch is switched off after the engine is operated for a long time, and the engine is started again a little while after the ignition switch is switched off, the exhaust gas purifying efficiency is relatively low. However, in this case, since only a small amount of harmful components is produced in the cylinders of the engine, the amount of harmful components in the exhaust gas is not very large.

An object of the present invention is to provide a catalyzer heating device so that a catalyzer is, when necessary, capable of reducing the amount of harmful components in the exhaust gas due to the fact that the catalyzer is rapidly heated when the temperature of the engine and the temperature of the catalyzer are relatively low, that is, when normally exhaust gas containing a large amount of harmful components therein is discharged to the atmosphere.

According to the present invention, there is provided a catalyzer heating device of an internal combustion engine having in its exhaust system a catalytic converter containing a catalyzer therein, said device comprising, a power source, means in said catalytic converter for heating said catalyzer, a first detecting means for providing a first signal indicating that the temperature of the engine is below a predetermined level, a second detecting means for providing a second signal indicating the temperature of said catalyzer, and control means for establishing an electrical connection between said power source and said heating means in response to said first and said second signals when the temperature of the engine is below a predetermined level and when the temperature of said catalyzer is below a predetermined level.

The present invention may be more fully understood from the following description of preferred embodiments of the invention, together with the accompanying drawings.

BRIEF DESCRIPTION OF THE DRAWINGS

In the drawings:

FIG. 4 is graphs showing the output signals of elements of the heat capacity control circuit shown in FIG. 3.

DESCRIPTION OF PREFERRED EMBODIMENT

Figure 1:
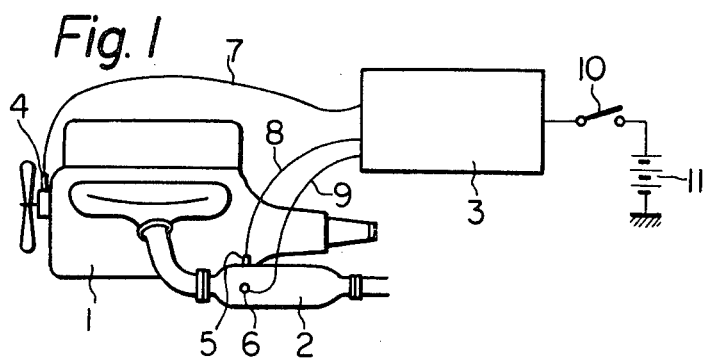
FIG. 1 is a schematic view of an internal combustion engine equipped with a catalyzer heating device according to the present invention.

Referring to FIG. 1, 1 designates an engine body, 2 a catalytic converter and 3 a heating control circuit. A coolant temperature reactive switch 4, detecting the temperature of coolant of the engine, is mounted on the engine body 1 and, on the other hand, a catalyzer heating apparatus 5 and a catalyzer temperature detector 6 are disposed in the catalytic converter 2. The coolant temperature reactive switch 4, the catalyzer heating apparatus 5 and the catalyzer temperature detector 6 are connected to the heating control circuit 3 via lead wires 7, 8 and 9, respectively. The heating control circuit 3 is connected to a battery 11 via an ignition switch 10.

Figure 2:
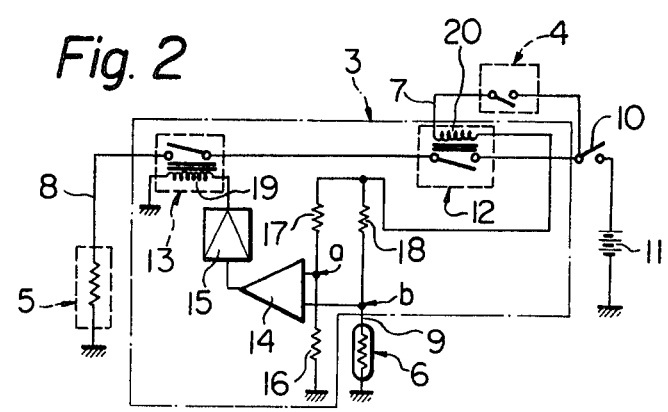
FIG. 2 is a circuit diagram of an embodiment of a heating control circuit.

FIG. 2 shows a circuit diagram of the heating control circuit 3 shown in FIG. 1. The coolant temperature reactive switch 4 is, for example, a wax valve, and is turned to the ON condition when the temperature of the coolant of the engine is below a predetermined level, for example, 60° through 80° C. The catalyzer heating apparatus 5 comprises a Nichrome wire or a glow plug. This glow plug is inserted into the catalyzer and heats the catalyzer located around the glow plug. The catalyzer temperature detector 6 comprises, for example, a thermistor disposed in the catalytic layer. The heating control circuit 3 comprises a pair of relays 12 and 13, a comparator 14, and an amplifier 15. One of the inputs of the comparator 14 is connected to a joining point a interconnecting a resistance 16 with a resistance 17 connected to the ignition switch 10, and the other input of the comparator 14 is connected to a joining point b interconnecting the thermistor 6 with a resistance 18 connected to the ignition switch 10. On the other hand, the output of the comparator 14 is connected to a solenoid 19 of the relay 13 via the amplifier 15. The coolant temperature reactive switch 4 is connected to the ignition switch 10 via a solenoid 20 of the relay 12.

When the ignition switch 10 is switched on, the voltage at the joining point a is maintained at a constant level. On the other hand, the voltage determined by a resistance ratio of the resistance 18 to the thermistor 6 appears at the joining point b. As is known to those skilled in the art, the value of resistance of the thermistor 6 is reduced as the temperature of the thermistor 6 is increased. Consequently, the voltage appearing at the joining point b is decreased as the temperature of the catalyzer is increased. The voltage appearing at the joining point a is set so as to be equal to the voltage appearing at the joining point b when the temperature of the catalyzer is equal to, for example, 300° C. Consequently, when the temperature of the catalyzer is relatively low and, thus, the value of resistance of the thermistor 6 is relatively large, the voltage appearing at the joining point b is elevated beyond the voltage appearing at the joining point a. As a result of this, since the comparator 14 is turned to the ON condition, the solenoid 19 is energized, whereby the relay 13 is switched to the ON condition. On the other hand, when the temperature of the coolant of the engine is relatively low, the coolant temperature reactive switch 4 is in the ON condition. As a result of this, since the solenoid 20 is energized, the relay 12 is switched to the ON condition. When both relays 12 and 13 are turned to the ON condition, a power is applied to the catalyzer heating apparatus 5 and, as a result, the catalyzer is heated. This heating operation of the catalyzer continues until the time when the temperature of the coolant of the engine or the temperature of the catalyzer is increased beyond a predetermined level and, thus, either of the relays 12 or 13 is de-energized.

Figure 3:
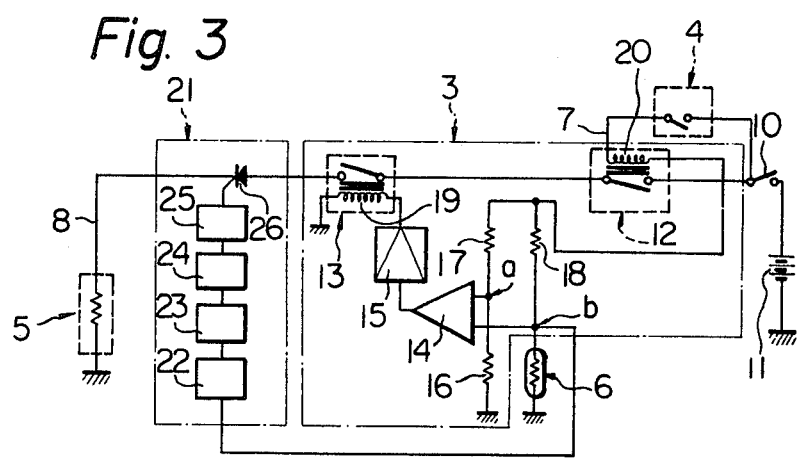
FIG. 3 is a circuit diagram of an alternative embodiment of a heating control circuit.

FIG. 3 shows an alternative embodiment according to the present invention. In this embodiment, a heat capacity control circuit 21 is further interposed between the catalyzer heating apparatus 5 and the relay 13 in addition to the heating control circuit 3 shown in FIG. 2. This heat capacity control circuit 21 comprises a voltage controlled oscillator 22 connected to the joining point b interconnecting the resistance 18 with the thermistor 6, a bistable multivibrator 23 connected to the output side of the voltage controlled oscillator 22, a frequency divider 24 connected to the output side of the bistable multivibrator 23, a monostable multivibrator 25 connected to the output side of the frequency divider 24, and a thyristor 26 interposed between the catalyzer heating apparatus 5 and the relay 13. The gate of the thyristor 26 is connected to the output side of the monostable multivibrator 25. If desired an operational amplifier (for example, No. μA715 NIPPON DENKI CO., LTD., JAPAN) can be used as the voltage controlled oscillator 22.

The operation of the heat capacity control circuit 21 will be described with reference to FIG. 4. FIG. 4(A) indicates the voltage appearing at the joining point b when the temperature of the catalyzer is relatively low and, thus, said voltage is relatively high, while FIG. 4(A') indicates the voltage appearing at the joining point a when the temperature of the catalyzer is relatively high and, thus, the voltage appearing at the joining point b is relatively low. FIGS. 4(B) and (B') indicate the output voltage of the voltage controlled oscillator 22. As is known to those skilled in the art, the voltage controlled oscillator 22 provides an output signal having a frequency proportional to the level of the input voltage. Therefore, the signal shown in FIG. 4(B) has a larger frequency than that shown in FIG. 4(B'). FIGS. 4(C) and (C') indicate the output signals of the bistable multivibrator 23. FIGS. 4(D) and (D') indicate the output voltages of the frequency divider 24. The frequency divider 24 provides a single pulse everytime the number of pulses produced in the bistable multivibrator 23 reaches a predetermined number. Thus, the interval between two successive pulses shown in FIG. 4(D) is shorter than that shown in FIG. 4(D'). FIGS. 4(E) and (E') indicate the output signals of the monostable multivibrator 25. This output signal has a fixed width and is produced everytime the output pulse is produced in the frequency divider 24. The thyristor 26 is turned to the ON condition when triggered by the steeply raising portion of the output pulse of the monostable multivibrator 25 and, on the other hand, the thyristor 26 is turned to the OFF condition when triggered by the steeply falling portion of the output pulse of the monostable multivibrator 25. Consequently, the thyristor 26 is in the ON condition a length of time during which the pulse is produced as shown in FIG. 4(F) and (F'). When the thyristor 26 is in the ON condition, power is applied to the catalyzer heating apparatus 5. Consequently, the catalytic heating apparatus 5 is operated a length of time during which the pulses shown in FIG. 4(F) and (F') are produced. Thus, when the temperature of the catalyzer is relative low, the length of time of the heating operation of the catalyzer heating apparatus 5 is longer compared with the case wherein the temperature of the catalyzer is relatively high. Consequently, the catalyzer is rapidly heated when the temperature of the catalyzer is relatively low, while the catalyzer is slowly heated when the temperature of the catalyzer is relatively high.

According to the present invention, the catalyzer is heated when the temperature of the catalyzer and the temperature of the engine are relatively low and, therefore, the amount of harmful components in the exhaust gas can be redcued over a considerably wide range of operating conditions of the engine. In addition, a plurality of catalyzer heating apparatuses 5 may be disposed in the catalytic converter 2.

While the invention has been described by reference to specific embodiments chosen purposes for illustration, it should be apparent that numerous modifications could be made thereto by those skilled in the art without departing from the spirit and scope of the invention.

What is claimed is:

1. A catalyzer heating device of an internal combustion engine having in its exhaust system a catalytic converter containing a catalyzer therein, said device comprising:
   a power source;
   means in said catalytic converter for heating said catalyzer;
   a first detecting means for providing a first signal indicating that the temperature of the engine is below a predetermined level;
   a second detecting means for providing a second signal indicating the temperature of said catalyzer, and;
   control means for establishing an electrical connection between said power source and said heating means in response to said first and said second signals when the temperature of the engine is below a predetermined level and when the temperature of said catalyzer is below a predetermined level.

2. A catalyzer heating device as claimed in claim 1, wherein said control means comprises two relays interposed in series between said power source and said heating means, and a discriminating circuit for discriminating said second signal and providing a discriminating signal indicating that the temperature of said catalyzer is below a predetermined level, one of said relays being actuated in response to said first signal and being turned to the ON condition when the temperature of the engine is below a predetermined level, the other relay being actuated in response to said discriminating signal and being turned to the ON condition when the temperature of the catalyzer is below a predetermined level.

3. A catalyzer heating device as claimed in claim 2, wherein said second signal is a variable voltage varied in accordance with changes in the temperature of said catalyzer, said discriminating circuit comprising a comparator for comparing said variable voltage with a reference voltage, and an amplifier connected to said comparator.

4. A catalyzer heating device as claimed in claim 2, wherein said control means further comprises a heat capacity control circuit for controlling the amount of electric current supplied to said heating means in accordance with changes in the temperature of the catalyzer.

5. A catalyzer heating device as claimed in claim 4, wherein said heat capacity control circuit comprises a voltage controlled oscillator connected to said second detecting means, a bistable multivibrator connected to said voltage controlled oscillator, a frequency divider connected to said bistable multivibrator, a monostable multivibrator connected to said frequency divider, and a thyristor connected to said monostable multivibrator and interposed in series with said relays between said heating means and said power source.

6. A catalyzer heating device as claimed in claim 1, wherein said heating means comprises a Nichrome wire disposed in said catalyzer.

7. A catalyzer heating device as claimed in claim 1, wherein said heating means comprises a glow plug disposed in said catalyzer.

8. A catalyzer heating device as claimed in claim 1, wherein said second detecting means comprises a thermister disposed in said catalyzer.

* * * * *